(12) United States Patent
Gao et al.

(10) Patent No.: US 9,577,721 B2
(45) Date of Patent: *Feb. 21, 2017

(54) METHOD AND EQUIPMENT FOR INFORMATION TRANSMISSION BASED ON COORDINATED MULTIPLE POINT TRANSMISSION

(71) Applicant: CHINA ACADEMY OF TELECOMMUNICATIONS TECHNOLOGY, Beijing (CN)

(72) Inventors: Qiubin Gao, Beijing (CN); Ranran Zhang, Beijing (CN); Wenhong Chen, Beijing (CN); Ying Peng, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,397

(22) Filed: May 17, 2016

(65) Prior Publication Data

US 2016/0269082 A1 Sep. 15, 2016

Related U.S. Application Data

(62) Division of application No. 14/237,923, filed as application No. PCT/CN2010/079772 on Aug. 7, 2012, now Pat. No. 9,398,574.

(30) Foreign Application Priority Data

Aug. 9, 2011 (CN) .......................... 2011 1 0227198

(51) Int. Cl.
H04B 7/02 (2006.01)
H04L 1/00 (2006.01)
(Continued)

(52) U.S. Cl.
CPC ............ H04B 7/024 (2013.01); H04B 7/0417 (2013.01); H04B 7/0626 (2013.01);
(Continued)

(58) Field of Classification Search
CPC ...... H04L 5/0048; H04L 5/005; H04L 5/0051; H04L 41/08; H04L 5/0057; H04B 7/024; H04B 7/0626

See application file for complete search history.

(56) References Cited

U.S. PATENT DOCUMENTS 8,238,307 B2 * 8/2012 Yang .................... H04B 7/0413
370/331
2010/0203887 A1 8/2010 Kim
(Continued)

FOREIGN PATENT DOCUMENTS

| CL | 101848485 A | 9/2010 |
|---|---|---|
| CN | 101848485 A | 9/2010 |

(Continued)

OTHER PUBLICATIONS

International Search Report for PCT/CN2012/079772, ISA/CN, Beijing, mailed Nov. 15, 2012.
(Continued)

Primary Examiner — Paul H Masur
(74) Attorney, Agent, or Firm — Harness, Dickey & Pierce, P.L.C.

(57) ABSTRACT

An information transmission method and equipment based on CoMP transmission are described. A user equipment determines a main transmission point. The user equipment determines RANK information of the main transmission point as well as channel state information corresponding to the RANK information. The user equipment sends the RANK information of the main transmission point and the channel state information to a network side equipment. The
(Continued)

UE reports channel state information of limited RANK of every transmission point, channel state information of unlimited RANK of the main transmission point, and relative phase information between the transmission points, etc., to the network side equipment.

18 Claims, 5 Drawing Sheets

(51) Int. Cl.
*H04B 7/04* (2006.01)
*H04L 5/00* (2006.01)
*H04W 24/08* (2009.01)
*H04W 72/02* (2009.01)
*H04W 72/04* (2009.01)
*H04W 72/06* (2009.01)
*H04B 7/06* (2006.01)
*H04L 12/24* (2006.01)
*H04W 24/10* (2009.01)

(52) U.S. Cl.
CPC .......... *H04L 1/0026* (2013.01); *H04L 5/0035* (2013.01); *H04L 5/0048* (2013.01); *H04L 5/0057* (2013.01); *H04L 41/0806* (2013.01); *H04W 24/08* (2013.01); *H04W 24/10* (2013.01); *H04W 72/02* (2013.01); *H04W 72/0413* (2013.01); *H04W 72/06* (2013.01)

(56) References Cited

U.S. PATENT DOCUMENTS

| | | | |
|---|---|---|---|
| 2010/0291940 A1 | 11/2010 | Koo et al. | |
| 2011/0305293 A1* | 12/2011 | Choi | H04W 72/082 375/285 |
| 2012/0052895 A1* | 3/2012 | Clerckx | H04W 72/0426 455/509 |
| 2012/0087332 A1* | 4/2012 | Kim | H04B 7/063 370/329 |
| 2013/0021925 A1* | 1/2013 | Yin | H04B 7/024 370/252 |
| 2013/0272206 A1* | 10/2013 | Li | H04B 7/024 370/328 |

FOREIGN PATENT DOCUMENTS

| | | |
|---|---|---|
| CN | 102291211 A | 12/2011 |
| EP | 2472940 A1 | 7/2012 |
| WO | 2010143873 A2 | 12/2010 |
| WO | 2011/038695 A1 | 4/2011 |

OTHER PUBLICATIONS

Chinese Office Action for Application No. 201110227198.3 dated Feb. 21, 2013, and its English translation thereof.
Chinese Office Action for Application No. 201110227198.3 dated Jul. 23, 2013 and its English translation thereof.
Huawei, "CSI-RS Design to Support Multiple-Cell Measurement," San Francisco, CA, USA, Feb. 22-26, 2010.
Huawei, RITT, Texas Instruments, CMCC, "Discussion on Timing Advance Issue in CoMP & Text Proposal," Ljubljana, Slovenia, Jan. 12-16, 2009.
European Office Action for Application No. 12822035.7 dated Jun. 8, 2015.
European Search Report for Application No. 12822035.7 dated Oct. 15, 2014.
LG Electronics, "Phase 1 CoMP Simulation Evaluation Results and Analysis for Full Buffer," Barcelona, Spain, May 9-13, 2011.
Samsung, "Performance Evaluation of CoMP JT for Scenario 2", 3GPP TSG RAN WG1 Meeting #65, Barcelona, Spain, May 9-13, 2011.
European Office Action for Application No. 12 822 035.7 dated Nov. 16, 2015.
European Office Action for Application No. 12 822 035.7 dated May 25, 2016.
Texas Instruments, "Consideration on UE Feedback in Support of CoMP", 3GPP TSG RAN WG1 57, San Francisco, USA, May 4-8, 2009.
European Office Action for Application No. 12822035.7, dated Oct. 5, 2016.

* cited by examiner

METHOD AND EQUIPMENT FOR INFORMATION TRANSMISSION BASED ON COORDINATED MULTIPLE POINT TRANSMISSION

CROSS-REFERENCE TO RELATED APPLICATIONS

This application is a divisional of U.S. Pat. No. 9,398,574 issued on Jul. 19, 2016. This application claims the benefit and priority of Chinese Application No. 201110227198.3, filed Aug. 9, 2011. The entire disclosures of each of the above applications are incorporated herein by reference.

FIELD

The present disclosure relates to the field of communication technology and to a method and equipment for information transmission based on coordinated multiple point transmission.

BACKGROUND

This section provides background information related to the present disclosure which is not necessarily prior art.

Coordinated multiple point transmission (CoMP) technology is a coordination between multiple geographically separated transmission points. The multiple transmission points can be base stations of different cells or can be multiple separated transmission equipment within a single cell. The CoMP technology can be mainly divided into two categories: CS/CB (Coordinated Scheduling/Beamforming) and JP (Joint Processing).

CS/CB uses the coordination of time, frequency, and space resources between cells to distribute mutually orthogonal resources for different user equipments (UEs), in order to prevent interference between each other. Because the interference between cells is the main reason limiting the performance of edge UEs of the cells, CS/CB can improve the performance of the edge UEs of the cells through lowering the interference between the cells.

Figure 1:
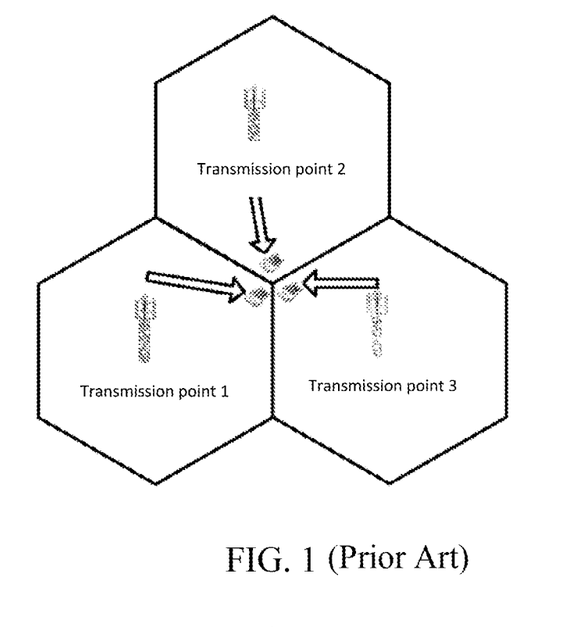
FIG. 1 shows a diagram of CS/CB in the current technology.

FIG. 1 is a diagram of CS/CB. Through joint scheduling of three cells, three possible interfering UEs can be dispatched onto mutually orthogonal resources (namely, onto different resources which include time, frequency, and space etc.), thereby effectively preventing interference between the cells.

Figure 2:
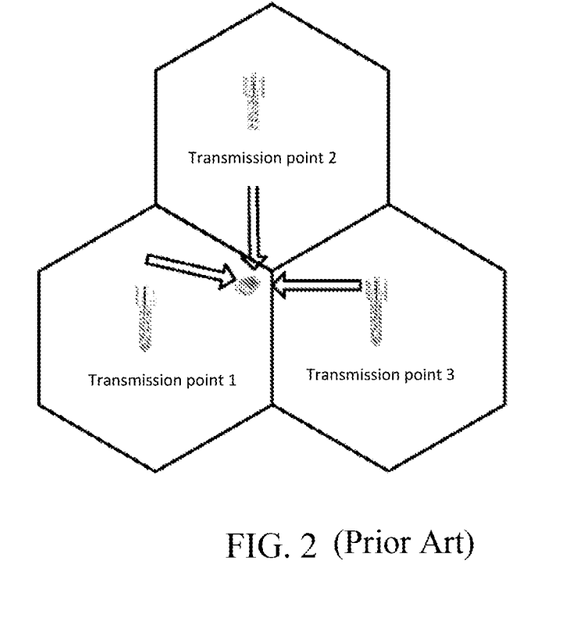
FIG. 2 shows a s diagram of JP in the current technology.

The difference between the JP scheme and the CS/CB scheme is that the JP scheme can send data to a UE from multiple cells simultaneously in order to enhance the received signal of the UE. As shown in FIG. 2, which is a diagram of JP, three cells send data to a UE on the same resource, and the UE simultaneously receives signals from the multiple cells. If all of the coordinating cells send the same data to the UE, then the useful signal from the multiple cells will be superimposed to improve signal reception quality of the UE. Thus, demodulation performance of UEs, especially the performance of edge UEs of the cells, may be improved.

Figure 3A:
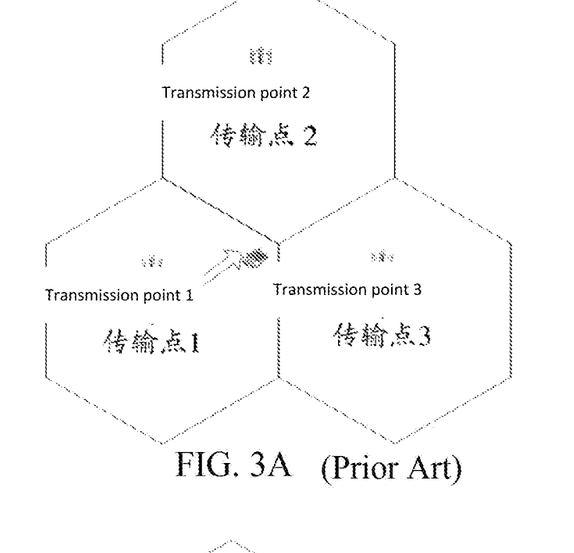
FIGS. 3A and 3B show diagrams of dynamic transmission point selection in the current technology.
Figure 3B:
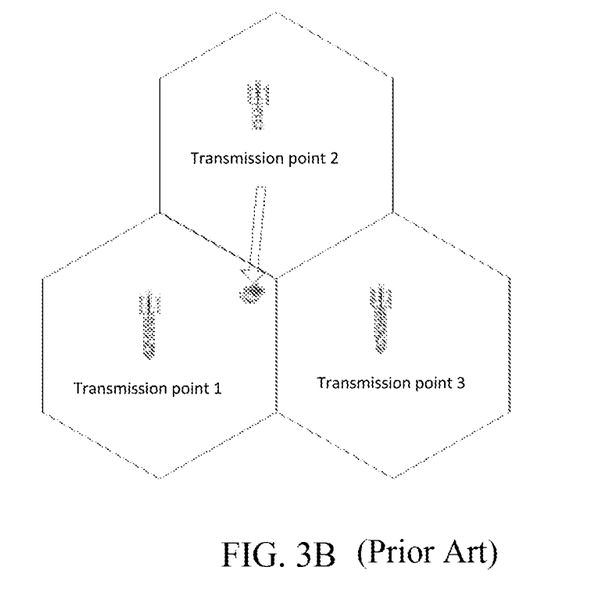

In the current technology, a special form of the JP scheme is dynamic transmission point selection. That is, a transmission point for sending data to a UE is dynamically selected based on channel conditions between the UE and the transmission point, and each time one transmission point sends data to the UE. FIGS. 3A and 3B are diagrams of the dynamic transmission point selection. In FIG. 3A, transmission point 1 is selected as the transmission point from which to send data to the UE. In FIG. 3B, transmission point 2 is selected as the transmission point from which to send data to the UE.

In the process of implementing the present disclosure, it was discovered that at least the following issues exist in the current technology: there is not a suitable method by which to send feedback for every scheme (CS/CB, JP, dynamic transmission point selection, etc.) in the current technology.

SUMMARY

This section provides a general summary of the disclosure, and is not a comprehensive disclosure of its full scope or all of its features.

A method and equipment for information transmission based on CoMP transmission are set forth in various embodiments of the present disclosure, in order to provide reasonable feedback for channel state information.

In order to achieve the above mentioned purpose, various embodiments of the present disclosure provide a method for information transmission based on coordinated multipoint transmission, including:

determining, by a user equipment (UE), a main transmission point;

determining, by the UE, RANK information of the main transmission point, and channel state information corresponding to the RANK information; and sending, by the UE, the RANK information and the channel state information of the main transmission point to a network side equipment.

Various embodiments of the present disclosure provide an information transmission method based on CoMP, including:

a network side equipment receiving RANK information and channel state information relating to a main transmission point from a UE; and the network side equipment carrying out processing based on the RANK information and the channel state information.

Various embodiments of the present disclosure provide a user equipment, including:

a first determination module, configured to determine a main transmission point;

a second determination module, configured to determine RANK information of the main transmission point, as well as channel state information corresponding to the RANK information; and a transmission module, configured to send the RANK information and the channel state information of the main transmission point to the network side equipment.

Various embodiments of the present disclosure provide a network side equipment, including:

a reception module, configured to receive RANK information and channel state information of a main transmission point from a UE; and a processing module, configured to carry out processing based on the RANK information and the channel state information.

Compared to the existing technologies, the various embodiments of the present disclosure have at least the following benefits. In an embodiment of the present disclosure, a UE reports channel state information of limited RANK of every transmission point, channel state information of unlimited RANK of a main transmission point, and relative phase information between transmission points, etc., to a network side equipment. It can thereby help the network side to better implement flexible selection and dynamic switchover of transmission schemes. Moreover, it does not notably increase feedback expenses for the UE.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In the process of implementing the present disclosure, it was noted that in order to support every type of CoMP transmission schemes, a network side equipment may acquire channel state information between a transmission point and a UE. The channel state information can be acquired through channel state information reported by the UE.

When the channel state information is reported by the UE, a reporting mode may be information reported by the UE, which can support all types of transmission schemes, such as CS/CB, JP, and dynamic transmission point selection, etc. That is, the feedback of the UE is universal. Under this reporting mode, after the UE reports the channel state information, the network side equipment can select an appropriate transmission scheme based on deployment scenarios and service conditions as well as other such factors. The selected transmission scheme is transparent to the UE, thereby achieving a comparatively higher degree of flexibility.

When implemented, a universal feedback can be achieved through a multiple level feedback method, namely, by sending channel state information of every transmission point in a measurement set and feeding back phase information and/or amplitude information between the transmission points, respectively. The measurement set is a set of transmission points allocated to the UE by the network side equipment, and the UE may observe the channel state information of the transmission points within the measurement set and provide feedback. Afterwards, the network side equipment may construct channel state information between a transmission point within the measurement set and the UE based on these two types of information.

As an example, if there are two transmission points included in the measurement set. Channels from the two transmission points to the UE are denoted as $H_1$ and $H_2$, separately. The UE chooses precoding matrixes $W_1$ and $W_2$ for the two transmission points, respectively, wherein the precoding matrix is considered as the channel state information. Phase and amplitude information, g, between the two cells can be accessed by the method described below:

$$\hat{g} = \underset{g}{\operatorname{argmax}} \left\| [H_1 H_2] \begin{bmatrix} w_1 \\ w_{2g} \end{bmatrix} \right\|^2$$

In the method, g belongs to a predefined codebook set. If the column number of $W_1$ and $W_2$ is denoted by M, then g is a diagonal matrix of M*M. When M=1, g degenerates to a scalar quantity. If g is a scalar quantity, then a codebook set A of g can be a point in a 16QAM (Quadrature Amplitude Modulation) constellation.

$$A = \frac{1}{\sqrt{10}} \{1+j, 1+3j, 3+j, 3+3j, 1-j, 1-3j, 3-j, 3-3j, -1+j,$$
$$-1+3j, -3+j, -3+3j, -1-j, -1-3j, -3-j, -3-3j\}$$

It can also be a point in a QPSK (Quadrature Phase Shift Keying) constellation:

$$A = \frac{1}{\sqrt{2}} \{1+j, 1-j, -1+j, -1-j\}$$

In the aforementioned scheme, all transmission points are treated equally by the UE during feedback. However, these transmission points have different functions. For example, in the CS/CB scheme and the dynamic transmission point selection scheme, one point may send information to the UE. The channel information of this transmission point may require higher precision than the rest transmission points. The transmission point should be able to support space multiplexing transmission (i.e., allowing RANK (i.e., the number of spatial multiplexing data layers)>1).

Due to the processing methods of different schemes, a dynamic transmission point selection scheme only needs the channel state information of one transmission point. To support other transmission schemes, information concerning other transmission points also required to be fed back, which has no significance in regard to the dynamic transmission point selection scheme. Further, to enable the JP scheme to support high RANK transmission may not bring about any obvious performance upgrades. Instead, it may bring about a higher level of complexity when performing feedback. Therefore, the JP scheme only needs to feedback channel state information of RANK 1 of every transmission point.

In view of the foregoing, the present disclosure provides an information transmission method and equipment based on coordinated multipoint transmission so as to satisfy the requirements on feedback contents of every type of scheme.

The following will integrate the drawings of the present disclosure to clearly explain the technical scheme of the present disclosure in complete and obvious detail. The embodiments described are only part of embodiments of the present disclosure and not all embodiments of the present disclosure. Based on the embodiments of the present disclosure, any embodiments obtained by those skilled in the art are within the scope of protection of the present disclosure, under the premise that no creative efforts are set forth.

Figure 4:
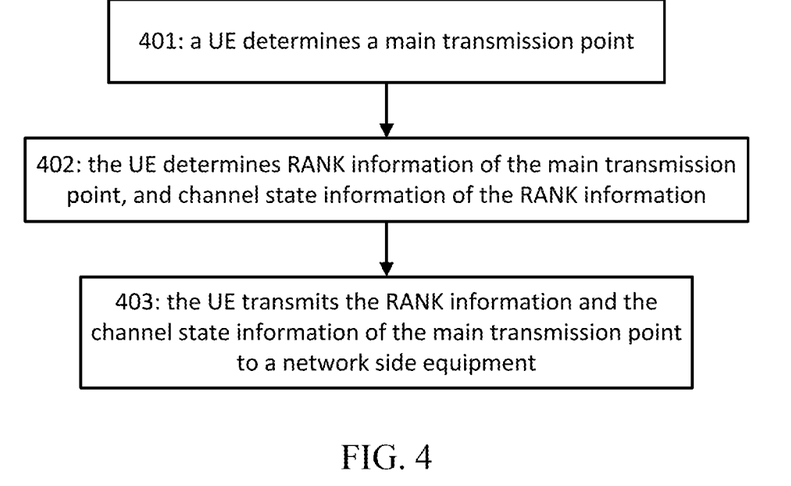
FIG. 4 shows a flow diagram of an information transmission method based on coordinated multipoint transmission according to various embodiments.

Various embodiments provide an information transmission method based on coordinated multiple point transmission. An explanation will be carried out based on an example of a UE side processing. As shown in FIG. 4, the information transmission method based on the coordinated multiple point transmission includes the following.

Block 401: A UE determines a main transmission point. The network side equipment can configure a measurement set for the UE. The configuration information of the measurement set may include identification information for multiple transmission points as well as pilot configuration information for multiple transmission points. Or, the configuration information of the measurement set only includes pilot configuration information for multiple transmission points. The pilot configuration information includes, but is not limited to one or any combination of a CSI-RS transmission period, offset and resource location, sequence, antenna port number information, transmission power, etc.

Therefore, based on the configuration information of the measurement set, when the network side equipment configures the main transmission point for the UE, the UE can then determine the main transmission point based on the configuration information of the main transmission point. That is, the network side equipment can designate any one or more transmission points within a measurement set as the main transmission point, and the UE can be informed of the main transmission point based on the situation. Or, the UE can, in accordance with an agreed upon manner, determine the main transmission point (such as by using a transmission point of a particular location within the measurement set as the main transmission point). Or, the UE can determine the main transmission point based on channel conditions of the measurement set configured by the network side equipment or a subset within the measurement set.

According to various embodiments, when the main transmission point is determined in accordance with an agreed upon manner or based on channel conditions (namely, determined by the UE itself), the UE still needs to send an identifier of the main transmission point to the network side equipment, such as an index value within the measurement set or the numbering within the subset of the measurement set. The subset is a set that the network allows the UE to choose as the main transmission point.

Block 402: The UE determines RANK information of the main transmission point as well as channel state information corresponding to the RANK information. Herein, the channel state information includes. but is not limited to, a precoding matrix indicator (PMI) and/or a channel quality indicator (CQI). According to various embodiments, the UE can estimate a channel from a transmission point in the measurement set to the UE and acquire the relevant channel state information. Thus, in regard to the determined main transmission point, the UE can freely select RANK information (namely Rank Indication (RI) information), and determine the channel state information (such as PMI/CQI) corresponding to the RANK information.

Block 403: The UE sends the RANK information and the channel state information of the main transmission point to the network side equipment, namely, the UE sends the RI/PMI/CQI of the main transmission point to the network side equipment. According to various embodiments, in regard to all transmission points within the measurement set, the UE may also determine limited RANK information of the transmission points as well as channel state information corresponding to the limited RANK information, and send the channel state information corresponding to the limited RANK information of the transmission points to the network side equipment. Further, the UE may transmit the limited RANK information of the transmission points to the network side equipment.

Herein, when the UE receives configuration information of the measurement set from the network side equipment, the configuration information of the measurement set can include identification information of the transmission point and pilot configuration information of the transmission point (or only include pilot configuration information of the transmission point) as well as limited RANK information of the transmission point. Thus, the UE can determine the limited RANK information of the transmission point. For example, when the RANK is limited to one, the UE may then determine the channel state information of every transmission point for RANK 1 (such as PMI/CQI), and feedback the channel state information having the RANK of 1 to the network side equipment.

According to various embodiments, in regard to all of the transmission points within the measurement set, the UE can also determine RANK information of a transmission point as the RANK information of the main transmission point as well as determine the channel state information corresponding to the RANK information of the transmission point, and send the channel state information corresponding to the transmission point's RANK information to the network side equipment.

According to various embodiments, after the UE receives the configuration information of the measurement set from the network side equipment, it can also calculate relative phase information of every transmission point in the measurement set relative to the main transmission point, and then send the relative phase information to the network side equipment.

In summary, according to various embodiments of the present disclosure, the UE reports the channel state information of limited RANK of every transmission point, the channel state information of unlimited RANK information of the main transmission point, relative phase information between transmission points, etc., to the network side equipment. It can thereby help the network side to better implement flexible selection and dynamic switchover of transmission schemes. Moreover, it does not notably increase feedback expenses for the UE.

Various embodiments of the present disclosure provide an information transmission method based on coordinated multiple point transmission. The processing on a network side equipment may be illustrated as an example. Herein, the equipment for implementing the disclosure at the network side (such as a base station equipment) may be a device that can control multiple transmission points, or may be a piece of equipment among the multiple transmission points, which will not be further addressed in this disclosure.

Figure 5:
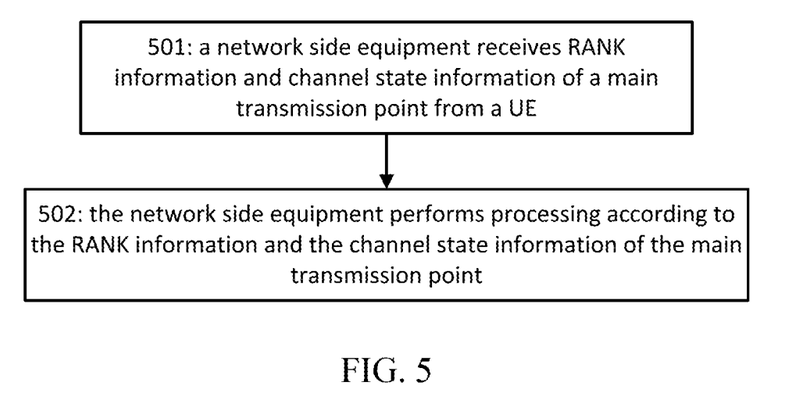
FIG. 5 shows a flow diagram of an information transmission method based on coordinated multipoint transmission according to various embodiments.

As shown in FIG. 5, the information transmission method based on the coordinated multiple point transmission includes the following.

Block 501: The network side equipment receives RANK information and channel state information from the UE regarding the main transmission point. Herein, the channel state information includes, but is not limited to, PMI and/or CQI.

Block 502: The network side equipment carries out processing based on the RANK information and the channel state information. For example, the network side equipment realizes operations including transmission point selection, user scheduling, precoding calculation, MCS selection, etc., based on the channel state information reported by the UE, and ultimately transmits data to the UE. According to various embodiments, prior to Block 501, the network side equipment may configure a measurement set for the UE. The configuration information of the measurement set includes identification information for multiple transmission points, as well as pilot configuration information of multiple transmission points, or it can include the pilot configuration information of the multiple transmission points. The pilot configuration information includes, but is not limited to, any one of or any combination of a CSI-RS transmission, offset and resource position, sequencing, antenna port number information, transmission power information, etc.

The network side equipment may then send the configuration information of the measurement set to the UE and designate one or more transmission points within the measurement set as the main transmission point. The UE then selects the main transmission point based on the configuration information of the measurement set.

According to various embodiments, the network side equipment can also send limited RANK information of the transmission point to the UE and receive channel state information corresponding to the limited RANK information of the transmission point from the UE. Further, the network side equipment can also receive the limited RANK information of the transmission point and corresponding channel state information from the UE. Moreover, the network side equipment can also receive the channel state information corresponding to the RANK information of the transmission point from the UE, wherein the RANK information for the transmission point is RANK information for the main transmission point.

According to various embodiments, the network side equipment can also receive relative phase information of every transmission point within the measurement set relative to the main transmission point from the UE.

According to various embodiments of the present disclosure, the UE reports the channel state information of the limited RANK of every transmission point, channel state information of the unlimited RANK of the main transmission point, relative phase information between transmission points, etc., to the network side equipment. It can thus help the network side to better implement flexible selection and dynamic switchover of transmission schemes without notably increasing the UE feedback expenses.

Figure 6:
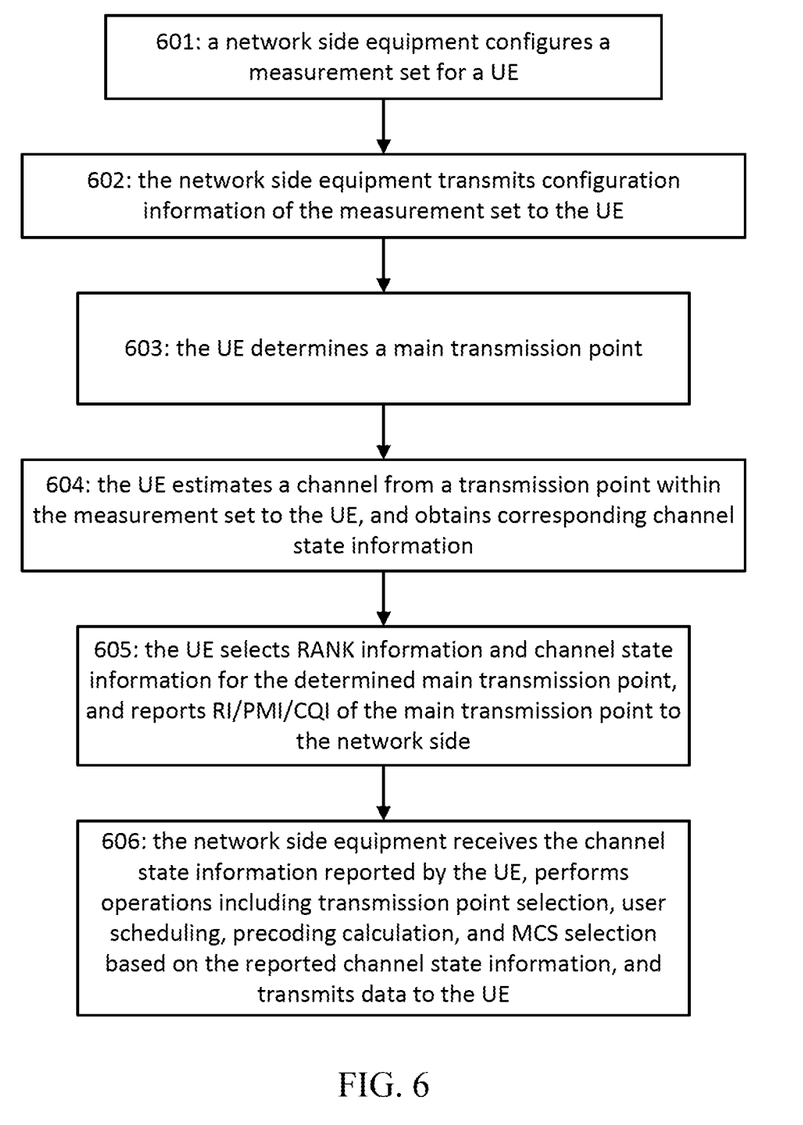
FIG. 6 shows a flow diagram of an information transmission method based on coordinated multipoint transmission according to various embodiments.

Various embodiments of the present disclosure provide an information transmission method based on coordinated multipoint transmission. The processing on the network side equipment and the UE side is illustrated as an example. The equipment of this disclosure implemented at the network side (such as a base station equipment) may be a device that can control multiple transmission points, or can be a piece of equipment among the multiple transmission points. As shown in FIG. 6, the information transmission method based on coordinated multipoint transmission includes the following.

Block 601: The network side equipment configures a measurement set for the UE. The configuration information of the measurement set includes identification information of many transmission points, as well as pilot configuration information of many transmission points, or, includes pilot configuration information of many transmission points. The pilot configuration information includes, but is not limited to, one of or any combination of the following: a CSI-RS transmission period, offset and resource position, sequencing, antenna port number information, transmission power information, etc.

Block 602: The network side equipment sends configuration information of the measurement set to the UE.

Block 603: the UE determines the main transmission point. According to various embodiments, the network side equipment can configure the main transmission point for the UE, namely, it designates any one or more transmission points within the measurement set as the main transmission point. Or, the UE can determine the main transmission point according to a stipulated manner, such as designating a transmission point in a particular position included in the measurement set as the main transmission point. Or, the UE can automatically determine the main transmission point. The UE selects one or more transmission points in the measurement set or in a subset of the measurement set as the main transmission point based on channel conditions.

Block 604: The UE estimates the channel from the transmission point within the measurement set to the UE and acquires corresponding channel state information.

Block 605: With regard to the determined main transmission point, the UE freely selects RANK information as well as corresponding channel state information (such as PMI/CQI), and reports RI/PMI/CQI of the main transmission point to the network side. According to various embodiments, if the main transmission point is determined by the UE itself, then the UE may report an identifier of the main transmission point, such as an index value in the measurement set or a numbering in a designated subset within the measurement set. The subset is a set within which the network allows the UE to select the main transmission point. According to various embodiments, in regard to all transmission points within the measurement set, the UE can also determine channel state information of the limited RANK. In an example, the RANK is limited as one, then channel state information for RANK 1 of every transmission point is determined. The UE then reports the corresponding channel state information of the limited RANK of every transmission point to the network side. According to various embodiments, in regard to all transmission points within the measurement set, the UE can also determine a RANK as the RANK of the main transmission point, determine the corresponding channel state information, and report the channel state information corresponding to the RANK of every transmission point to the network side equipment. Alternatively, according to various embodiments, the UE can also calculate relative phase information of every transmission point within the measurement set relative to the main transmission point, and report it to the network side equipment.

Block 606: the network side equipment receives channel state information reported by the UE, carries out selection of a transmission point, user scheduling, precoding calculation, modulation and coding style (MCS) selection, etc., based on the channel state information reported by the UE, and ultimately transmits data to the UE. According to various embodiments, the channel state information reported by the UE may be carried on a physical uplink control channel or on a physical uplink shared channel.

In summary, according to various embodiments of the present disclosure, the UE reports channel state information of limited RANK of every transmission point, an identifier of the main transmission point, channel state information of unlimited RANK of the main transmission point, and relative phase information between transmission points, etc., to the network side equipment. Thus, it can help the network side to better implement flexible selection and dynamic switchover of transmission schemes without notably increasing the UE feedback expenses.

Figure 7:
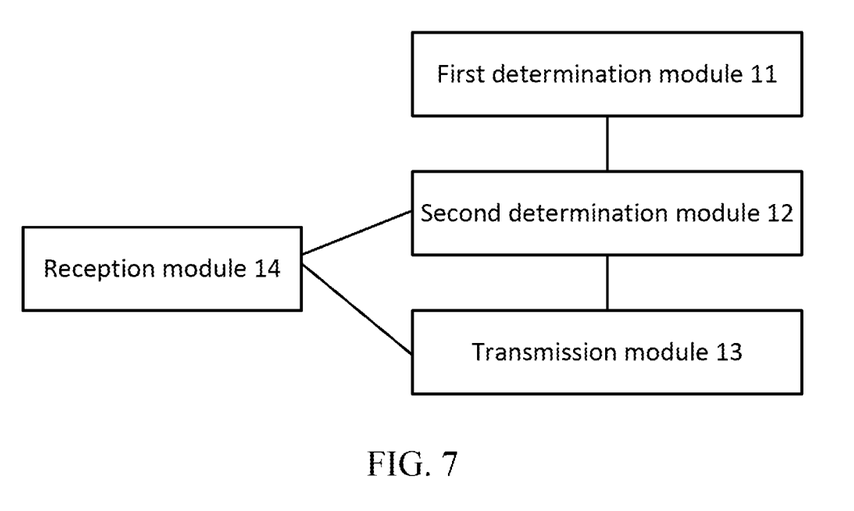
FIG. 7 shows a diagram of the composition of a user equipment according to various embodiments.

Based on the same concept as described above, various embodiments also provide a user equipment. As shown in FIG. 7, the user equipment includes a first determination module 11, configured to determine a main transmission point; a second determination module 12, configured to determine RANK information of the main transmission point as well as its corresponding channel state information; and a transmission module 13, configured to send the RANK information and the channel state information of the main transmission point to a network side equipment.

When the network side equipment configures the main transmission point for the user equipment, the first determination module 11 is configured to determine the main transmission point based on the configuration information of the main transmission point; or, determine the main transmission point according to an appointed manner, or, determine the main transmission point based on channel conditions within a measurement set or within a subset of the measurement set configured by the network side equipment.

The transmission module 13 is also configured to send an identifier of the main transmission point to the network side equipment when the main transmission point is determined according to the appointed manner or based on the channel conditions. The second determination module 12 is also configured to determine limited RANK information of transmission points as well as channel state information corresponding to the limited RANK information. The transmission module 13 is also configured to send the channel state information of the limited RANK information of the transmission point to the network side equipment. The transmission module 13 is further configured to send the limited RANK information of the transmission point to the network side equipment.

The user equipment also includes a reception module 14, configured to receive configuration information of the measurement set from the network side equipment. The configuration information of the measurement set includes identification information of the transmission point, pilot configuration information of the transmission point, and limited RANK information of the transmission point; or, includes pilot configuration information as well as limited RANK information of the transmission point.

The reception module 14 is configured to receive configuration information of the measurement set from the network side equipment. The configuration information of the measurement set includes identification information of the transmission point and pilot configuration information of the transmission point, or includes pilot configuration information of the transmission point.

The second determination module 12 is also configured to take the transmission point's RANK information as RANK information of the main transmission point, and determine channel state information corresponding to the transmission point's RANK information. The transmission module 13 is also configured to send the corresponding channel state information of the RANK information of the transmission point to the network side equipment.

The reception module 14 is configured to receive configuration information of the measurement set from the network side equipment. The configuration information of the measurement set includes identification information of the transmission point and pilot configuration information of the transmission point, or includes pilot configuration information of the transmission point.

The transmission module 13 is also configured to calculate relative phase information of every transmission point in the measurement set relative to the main transmission point and send the relative phase information to the network side equipment.

The channel state information includes a precoding matrix indicator (PMI) and/or a channel quality indicator (CQI).

According to various embodiments of the present disclosure, every module in the equipment of the present disclosure can be integrated in one body, and can also be deployed separately. The aforementioned modules can be merged as one module, and can also be further split up into multiple individual modules.

Figure 8:
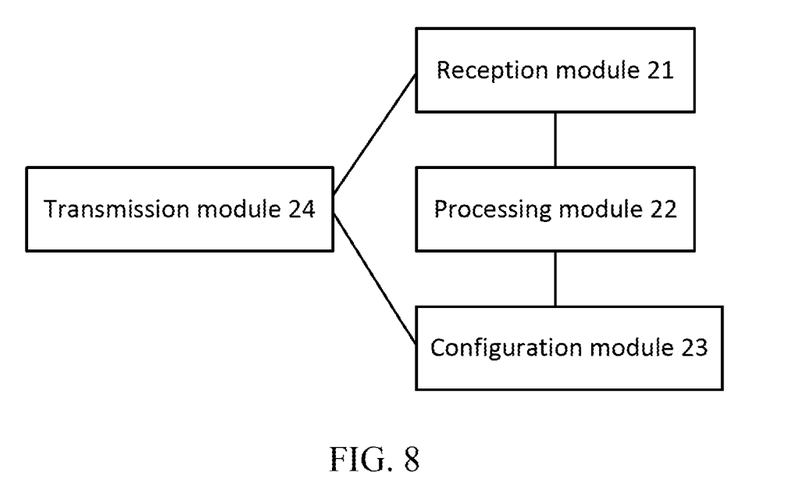
FIG. 8 shows a diagram of the composition of a network side equipment according to various embodiments.

Based on the same concept in the method described above, various embodiments of the present disclosure also provide a network side equipment. As shown in FIG. 8, the network side equipment includes the following modules. A reception module 21 is configured to receive RANK information and channel state information of a main transmission point from a UE. A processing module 22 is configured to carry out processing based on the RANK information and the channel state information. A configuration module 23 is also included in the network side equipment, which is configured to allocate a measurement set for the UE. The configuration information of the measurement set includes identification information of multiple transmission points and pilot configuration information of the transmission points, or includes pilot configuration information of the transmission points. The transmission module 24 is configured to send configuration information of the measurement set to the UE, and designate one or more transmission points within the measurement set as the main transmission point. The reception module 21 is further configured to receive channel state information corresponding to limited RANK information of a transmission point from the UE. The reception module 21 is further configured to receive limited RANK information of the transmission point as well as corresponding channel state information from the UE. The transmission module 24 is configured to send limited RANK information of the transmission point to the UE. The reception module 21 is also configured to receive from the UE channel state information corresponding to the RANK information of the transmission point, wherein the RANK information of the transmission point is RANK information of the main transmission point. The reception module 21 is also configured to receive relative phase information of every transmission point relative to the main transmission point within the measurement set of the user equipment. The channel state information includes a precoding matrix indicator (PMI) and/or a channel quality indicator (CQI). Herein, every module in the equipment in this disclosure can be integrated in one body, or can also be deployed separately. The aforementioned modules can be merged as one module, or can also be further split up into multiple submodules.

Through the above description of the implementation manners, those skilled in the art will understand that this disclosure can be implemented through support from software and a necessary universal hardware platform, or can naturally also be implemented through hardware, but in many cases the former is a better method. Based on this understanding, the technical scheme of this disclosure, or in terms of parts contributed to the prior art, can be embodied in the form of a software product. This computer software product can be stored in a storage medium, and includes several instructions for using a computer device (which can be a personal computer, server, or network equipment, etc.) to implement the method of the embodiments in the present disclosure.

Those skilled in the art will understand that the figures are diagrams of preferred embodiments and that not all the modules or processes in the figures are necessary in this disclosure.

Those skilled in the art can understand that the modules in the equipment in the embodiments can be distributed and embodied within the equipment according to the description of the embodiments, and can also undergo appropriate variations and embodied in one or more equipment different from the described embodiments. The modules in the aforementioned embodiments can be merged as one module, or can also be further split up into multiple individual modules.

The serial number of the aforementioned embodiments is only for the purpose of its description and is not representative of the merits and drawbacks of the embodiments. The disclosure above only mentions a few specific embodiments of the invention, however, the invention is not only limited to these. Anyone who is skilled in the art can think of changes that would be covered under the scope of protection of this invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A method for information transmission based on coordinated multipoint transmission, comprising:
   determining, by a user equipment (UE), a main transmission point;
   determining, by the UE, RANK information of the main transmission point, and channel state information corresponding to the RANK information, wherein the RANK refers to a number of spatial multiplexing data layers; and
   sending, by the UE, the RANK information and the channel state information of the main transmission point to a network side equipment;
   wherein the method further comprises:
   receiving, by the UE, configuration information of the measurement set from the network side equipment, wherein the configuration information of the measurement set comprises identification information of a transmission point and pilot configuration information of the transmission point, or comprises pilot configuration information of the transmission point;
   taking, by the UE, the RANK information of the main transmission point as RANK information of the transmission point, and determining the channel state information corresponding to the RANK information of the transmission point; and
   sending, by the UE, the channel state information corresponding to the RANK information of the transmission point to the network side equipment.

2. The method of claim 1, wherein determining by the UE the main transmission point comprises:
   determining, by the UE, the main transmission point based on configuration information of the main transmission point when the network side equipment configures the main transmission point for the UE; or
   determining, by the UE, the main transmission point according to an agreed upon manner; or
   determining, by the UE, the main transmission point based on channel conditions within a measurement set or within a subset of the measurement set configured by the network side equipment.

3. The method of claim 2, further comprising:
   after the UE determining the main transmission point, when the main transmission point is determined according to the agreed upon manner or based on the channel conditions, sending, by the UE, an identifier of the main transmission point to the network side equipment.

4. The method of claim 1, further comprising:
   determining, by the UE, limited RANK information of a transmission point as well as channel state information corresponding to the limited RANK information; and
   sending, by the UE, the channel state information corresponding to the limited RANK information of the transmission point to the network side equipment;
   sending, by the UE, the limited RANK information of the transmission point to the network side equipment.

5. The method of claim 1, further comprising:
   determining, by the UE, limited RANK information of a transmission point as well as channel state information corresponding to the limited RANK information; and
   sending, by the UE, the channel state information corresponding to the limited RANK information of the transmission point to the network side equipment;
   wherein determining by the UE the limited RANK information of the transmission point comprises:
   receiving, by the UE, configuration information of the measurement set from the network side equipment;
   wherein the configuration information of the measurement set comprises identification information of a transmission point, pilot configuration information of the transmission point, and limited RANK information of the transmission point; or comprises pilot configuration information of the transmission point, and limited RANK information of the transmission point.

6. The method of claim 1, further comprising:
   receiving, by the UE, configuration information of the measurement set from the network side equipment, wherein the configuration information of the measurement set comprises identification information of the transmission point and pilot configuration information of the transmission point, or comprises pilot configuration information of the transmission point; and
   calculating, by the UE, relative phase information of every transmission point relative to the main transmission point within the measurement set, and sending the relative phase information to the network side equipment.

7. The method of any of claim 1, wherein the channel state information comprises a precoding matrix indicator (PMI) and/or a channel quality indicator (CQI).

8. A user equipment, comprising one or more processors, and a memory for storing one or more modules to be executed by the one or more processors, wherein the one or more modules comprise a first determination module, a second determination module, a transmission module and a reception module:
   the first determination module is to determine a main transmission point;
   the second determination module is to determine RANK information of the main transmission point as well as channel state information corresponding to the RANK information, wherein the RANK refers to a number of spatial multiplexing data layers; and
   the transmission module is to send the RANK information and the channel state information of the main transmission point to the network side equipment;
   the reception module is to receive configuration information of the measurement set from the network side equipment, wherein the configuration information of the measurement set comprises identification information of the transmission point and pilot configuration information of the transmission point, or comprises pilot configuration information of the transmission point;

the second determination module is further to take the RANK information of the main transmission point as RANK information of the transmission point, and determine the channel state information corresponding to the RANK information of the transmission point; and the transmission module is further to send the channel state information corresponding to the RANK information of the transmission point to the network side equipment and/or is further to calculate relative phase information of every transmission point relative to the main transmission point in the measurement set and send the relative phase information to the network side equipment.

9. The user equipment of claim 8, wherein the first determination module is further to:

determine the main transmission point based on the configuration information of the main transmission point when the network side equipment configures the main transmission point for the UE; or, determine the main transmission point according to an agreed upon manner; or, determine the main transmission point based on channel conditions within a measurement set or within a subset of the measurement set configured by the network side equipment.

10. The user equipment of claim 9, wherein the transmission module is further to send an identifier of the main transmission point to the network side equipment when the main transmission point is determined in accordance with the agreed upon manner or the main transmission point is determined based on the channel conditions.

11. The user equipment of claim 8, wherein the second determination module is further to determine limited RANK information of a transmission point as well as channel state information corresponding to the limited RANK information; and the transmission module is further to send the channel state information corresponding to the limited RANK information of the transmission point to the network side equipment;

the transmission module is further to send the limited RANK information of the transmission point to the network side equipment.

12. The user equipment of claim 8, wherein the second determination module is further to determine limited RANK information of a transmission point as well as channel state information corresponding to the limited RANK information; and the transmission module is further to send the channel state information corresponding to the limited RANK information of the transmission point to the network side equipment; and the reception module is to receive configuration information of the measurement set from the network side equipment, wherein the configuration information of the measurement set comprises identification information of the transmission point, pilot configuration information of the transmission point, and limited RANK information of the transmission point; or, comprises pilot configuration information of the transmission point, and limited RANK information of the transmission point.

13. The user equipment of claim 8, wherein the channel state information comprises a precoding matrix indicator (PMI) and/or a channel quality indicator (CQI).

14. A network side equipment, comprising one or more processors, and a memory for storing one or more modules to be executed by the one or more processors, wherein the one or more modules comprise a reception module, a processing module, a configuration module and a transmission module:

the reception module is to receive RANK information and channel state information of a main transmission point from a UE, wherein the RANK refers to a number of spatial multiplexing data layers; and the processing module is to carry out processing based on the RANK information and the channel state information;

the configuration module is to configure a measurement set for the UE, wherein the configuration information of the measurement set comprises identification information of multiple transmission points and pilot configuration information of the transmission points, or comprises pilot configuration information of the transmission points; and the transmission module is to send the configuration information of the measurement set to the UE, and designate one or more transmission points within the measurement set as the main transmission point.

15. The network side equipment of claim 14, wherein the reception module is further to receive the limited RANK information of the transmission point as well as the corresponding channel state information from the UE.

16. The network side equipment of claim 14, wherein the reception module is further to receive from the UE the channel state information corresponding to limited RANK information of the transmission point; and the transmission module is to send the limited RANK information of the transmission point to the UE.

17. The network side equipment of claim 14, wherein the reception module is further to receive the channel state information corresponding to the RANK information of the transmission point from the UE, wherein the RANK information of the main transmission point is taken as RANK information of the transmission point; and/or the reception module is further to receive relative phase information of every transmission point in the measurement set relative to the main transmission point.

18. The network side equipment of claim 14, wherein the channel state information comprises a precoding matrix indicator (PMI) and/or a channel quality indicator (CQI).

* * * * *